(12) United States Patent
Janes

(10) Patent No.: US 7,505,419 B2
(45) Date of Patent: Mar. 17, 2009

(54) SYSTEM AND METHOD FOR ENABLING BALANCED RESOURCE UTILIZATION

(75) Inventor: Stephen D. Janes, Fort Collins, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 814 days.

(21) Appl. No.: 10/978,957

(22) Filed: Nov. 1, 2004

(65) Prior Publication Data

US 2006/0092852 A1 May 4, 2006

(51) Int. Cl.
*H04L 12/26* (2006.01)
(52) U.S. Cl. ....................................................... 370/252
(58) Field of Classification Search .................. 370/252
See application file for complete search history.

(56) References Cited

U.S. PATENT DOCUMENTS

| 5,884,202 | A | | 3/1999 | Arjomand |
| 6,141,565 | A | * | 10/2000 | Feuerstein et al. .......... 455/560 |
| 6,625,648 | B1 | | 9/2003 | Schwaller et al. |
| 6,807,178 | B1 | | 10/2004 | Lemieux |
| 2004/0138925 | A1 | | 7/2004 | Zheng |

* cited by examiner

*Primary Examiner*—Melvin Marcelo

(57) ABSTRACT

A system and method to enable balanced resource utilization during testing of a wireless communications network. The system and method determines the properties, including the status, for resources, and stores the properties for later comparison. Utilization information is calculated from the properties and provided to the user based on criteria from user-specified resource filters. Balanced resource utilization is enabled based on the utilization information.

19 Claims, 4 Drawing Sheets

FIG. 3

SYSTEM AND METHOD FOR ENABLING BALANCED RESOURCE UTILIZATION

BACKGROUND OF THE INVENTION

This invention relates generally to resource utilization when testing a wireless communications network.

Within a multimedia communications network, probes and associated air/wireless interfaces are very costly to the customer. Moreover, the cost also includes software to make the probes and interfaces operational. Therefore, it is important that the probe be utilized in the most efficient manner possible.

Currently, it is not easy or, in some cases not possible to identify under-utilized interfaces and assign more tests to be run on them, or to view resource utilization on a per user basis or to identify which probes are available for ad-hoc testing What is needed is a product and method that offers the capability to track and report on utilization statistics for each resource, which can include, but is not limited to, an interface (e.g. Global System for Mobile Communications (GSM), Universal Mobile Telecommunication System (UMTS), etc) and a Subscriber Identity Module (SIM), (e.g. International Mobile Subscriber Identifier (IMSI)), to enable balanced resource utilization during a wireless test.

SUMMARY OF THE INVENTION

The problems set forth above as well as further and other problems are resolved by the present invention. The solutions and advantages of the present invention are achieved by the illustrative embodiments and methods described herein below.

The system and method of the present invention enable balanced resource utilization of at least one resource during a wireless communications test by monitoring at least one property, including, but not limited to, time in use and status, of at least one resource, calculating utilization information based on at least one property, providing the utilization information based on user-specified filter criteria, and enabling balanced resource utilization according to said utilization information.

At startup, the system can query the underlying database of the hardware platform, and can create resource entries for every resource found. Thereafter, every n seconds, where n is user configurable, the system can monitor the same database, and analyze at least one property for each resource. Such analysis can include, but is not limited to, determining the current status of the resource. In addition, the system can detect any additions/deletions of resources, as well as any property changes that may have been made, and can update the resource entries accordingly. Also, utilization information can be calculated that identifies periods when the resource is active and when the resource is idle. The processes of monitoring resources and calculating utilization information continue substantially in parallel throughout the execution lifetime of an agent that monitors the underlying database of the hardware platform.

The system and method of the present invention can also provide a reporting capability to provide utilization information so that a user can easily see which interfaces are operational or not, and which ones are under-utilized. By identifying which interfaces are under-utilized, additional tests can be configured, either automatically or manually on an ad hoc basis, against these interfaces, therefore maximizing the investment in the interfaces before purchasing more equipment. Ad-hoc testing is not done in a scheduled manner, but on demand. The reporting capability makes it possible to easily identify which interfaces are available (idle) so that those idle interfaces can be used for ad hoc testing. The reporting capability can include a filtering capability that can allow selection of utilization information according to, for example, the interfaces of interest to a particular user.

For a better understanding of the present invention, reference is made to the accompanying drawings and detailed description. The scope of the present invention is pointed out in the appended claims.

DESCRIPTION OF THE SEVERAL VIEWS OF THE DRAWING

FIG. 3 is a screen shot showing utilization on a per resource basis; and

DETAILED DESCRIPTION OF THE INVENTION

Figure 1:
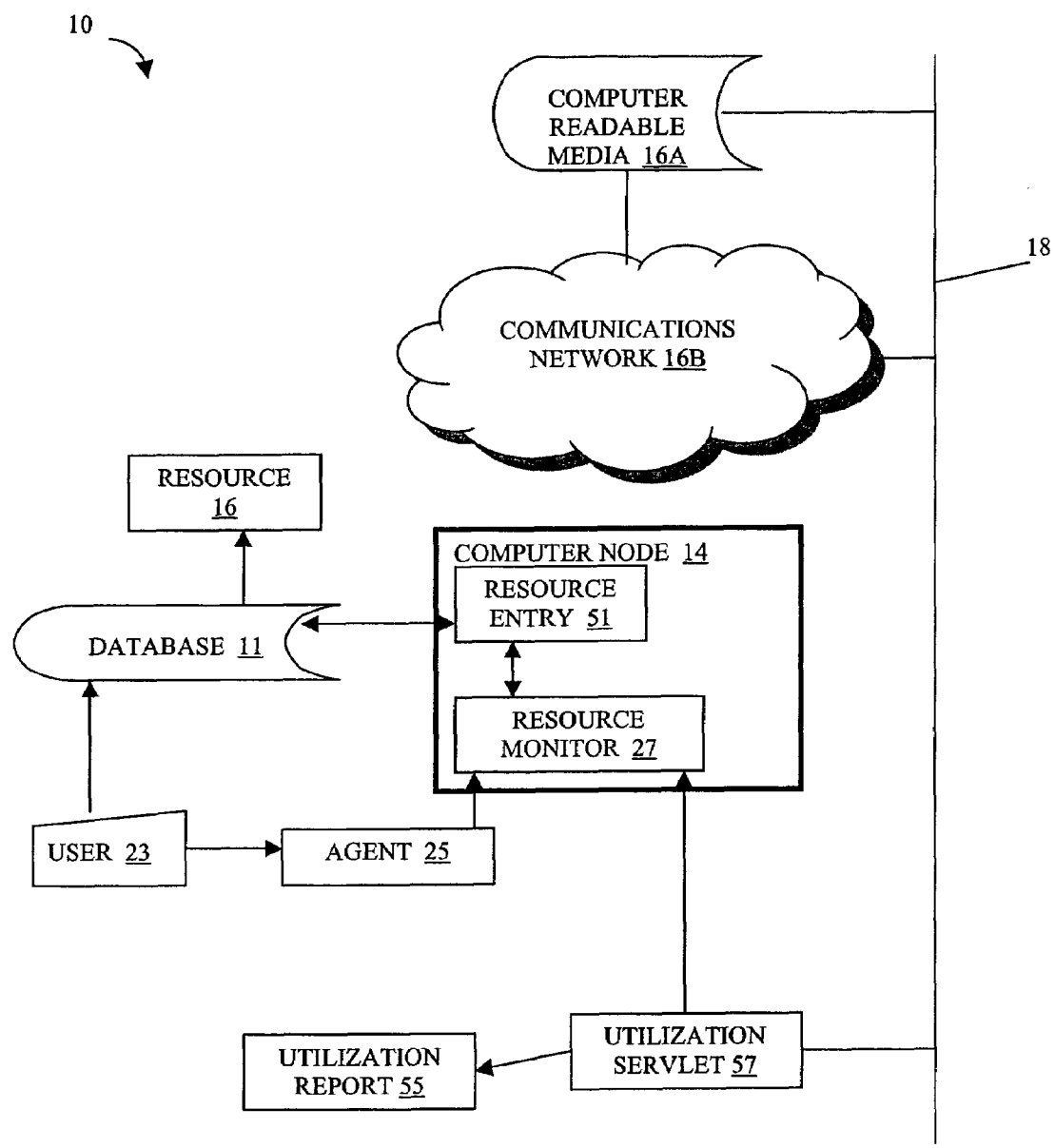
FIG. 1 is a schematic block diagram of the environment in which the system and method of the present invention can execute.

The present invention is now described more fully hereinafter with reference to the accompanying views of the drawing, in which the illustrative embodiments of the present invention are shown.

Referring now to FIG. 1, system 10 of the illustrative embodiment of the present invention can execute within at least one computer node 14, which may have, but is not limited to, an electronic connection 18 to at least one communications network 16B and at least one computer readable medium 16A. System 10 can include, but is not limited to, agent 25, resource monitor 27, and at least one resource entry 51. At least one resource 16 can be configured by, for example, user 23, in database 11 and can be associated with at least one resource entry 51. Resource monitor 27, invoked by agent 25 during wireless test execution, can provide at least one property associated with at least one resource entry 51 to utilization servlet 57 for the creation of utilization report 55.

Figure 2:
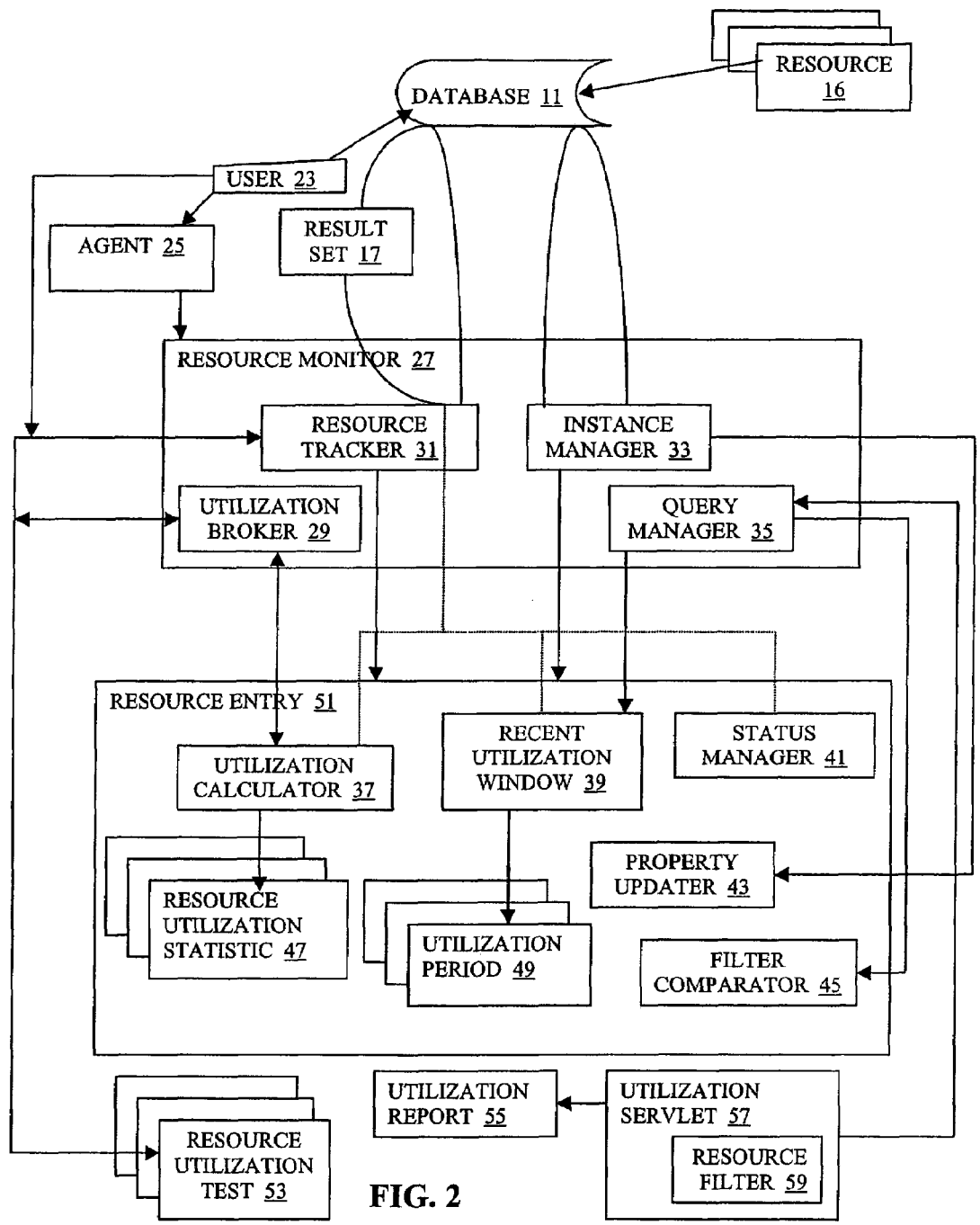
FIG. 2 is a schematic block diagram of the components of the system of the illustrative embodiment of the present invention.

Referring now to FIG. 2, services, for example wireless services, provided through at least one communications network 16B, can be tested by the use of at least one resource 16. At least one resource 16 can be configured within database 11, and is associated with at least one resource entry 51 that includes at least one property of at least one resource 16. User 23 can invoke agent 25 which can invoke resource monitor 27 that can include, but is not limited to, resource tracker 31, instance manager 33, utilization broker 29, and query manager 35. Resource tracker 31 can monitor at least one property of at least one (newly-discovered or existing) resource entry 51. For each newly-discovered at least one resource 16, resource tracker 31 can create a new at least one resource entry 51. Each at least one resource entry 51 can include, but is not limited to, utilization calculator 37, recent utilization window 39, status manager 41, property updater 43, and filter comparator 45. Utilization calculator 37 can be used by at least one resource utilization test 53, along with utilization servlet 57, and can compute, for example, but not limited to, overall utilization time, overall idle time, overall utilization percentage, as well as interval utilization time, interval idle time, and interval utilization percentage. Recent utilization window 39 can compute utilization information from the at least one property over a user-specified or default time-frame which can be, for example, 24 hours, and can support queries for recent utilization information over various time periods such as, but not limited to, 1 minute, 5 minutes, 15 minutes, 30 minutes, 1 hour, 4 hours, 8 hours, 12 hours, and 24 hours. Recent utilization information can yield more accurate results than overall utilization information if the resource infrastructure has changed; moreover, it can identify the most recent under-utilized at least one resource 16 for on-demand testing.

Continuing to refer to FIG. 2, status manager 41 can determine the status of at least one resource 16. Possible status values can be, but are not limited to, busy, idle, reserved, disabled, and down. For both newly-discovered and existing at least one resource entries 51, resource tracker 31 can pass result set 17 from the resource query to utilization calculator 37, recent utilization window 39, and status manager 41 which can process result set 17 and update internal variables. Instance manager 33 can monitor database 11 for any additions, deletions, or modifications to at least one resource entry 51, indicating when at least one resource 16 is added or deleted, and when at least one property of at least one resource entry 51 has been updated. When at least one resource 16 is added to or deleted from the configuration, instance manager 33 can update an internal list of resource entries to include the change. If at least one resource 16 is modified, property updater 43 can manage updates to at least one property that characterizes at least one resource 16. Utilization information can reflect dynamic changes in at least one property.

Continuing to further refer to FIG. 2, utilization broker 29 can manage incoming requests from at least one resource utilization test 53. Each at least one resource utilization test 53 has an indirect reference to at least one resource entry 51 that utilization broker 29 can use to locate at least one resource entry 51 and invoke utilization calculator 37. Utilization calculator 37 can create resource utilization statistic 47 that utilization broker 29 provides to at least one resource utilization test 53. At least one resource utilization test 53 is optionally configured by user 23 and executes on a regularly scheduled interval. At least one resource utilization test 53 can invoke utilization broker 29 to calculate utilization for at least one test interval. Utilization broker 29 can return results of the calculation to at least one resource utilization test 53, which returns them to agent 25, which enables preparing a test execution report for the given at least one resource 16. If utilization broker 29 cannot locate at least one resource entry 51, utilization broker 29 can provide a null at least one resource utilization statistic 47 indicating that at least one resource utilization test 53 no longer references a valid at least one resource entry 51. At least one resource utilization statistic 47 can contain measurements such as, but not limited to, overall utilization percentage, overall utilization time, overall idle time, interval utilization percentage, interval utilization time, and interval idle time.

Continuing still further to refer to FIG. 2, query manager 35 can handle incoming requests from utilization servlet 57, which can be used to produce at least one utilization report 55. Utilization servlet 57 can allow user 23 to formulate resource queries using criteria from resource filter 59. Resource filter 59 can specify criteria by which certain resource information is included in at least one utilization report 55. Such criteria can include, but are not limited to, whether or not at least one resource entry 51 is for a particular user 23, as well as a particular resource type, resource host, IMSI, or status. Query manager 35 can invoke filter comparator 45 to retrieve appropriate resource information, and can invoke recent utilization window 39 to perform the most recent utilization information calculation if the criteria are met.

Figure 3:
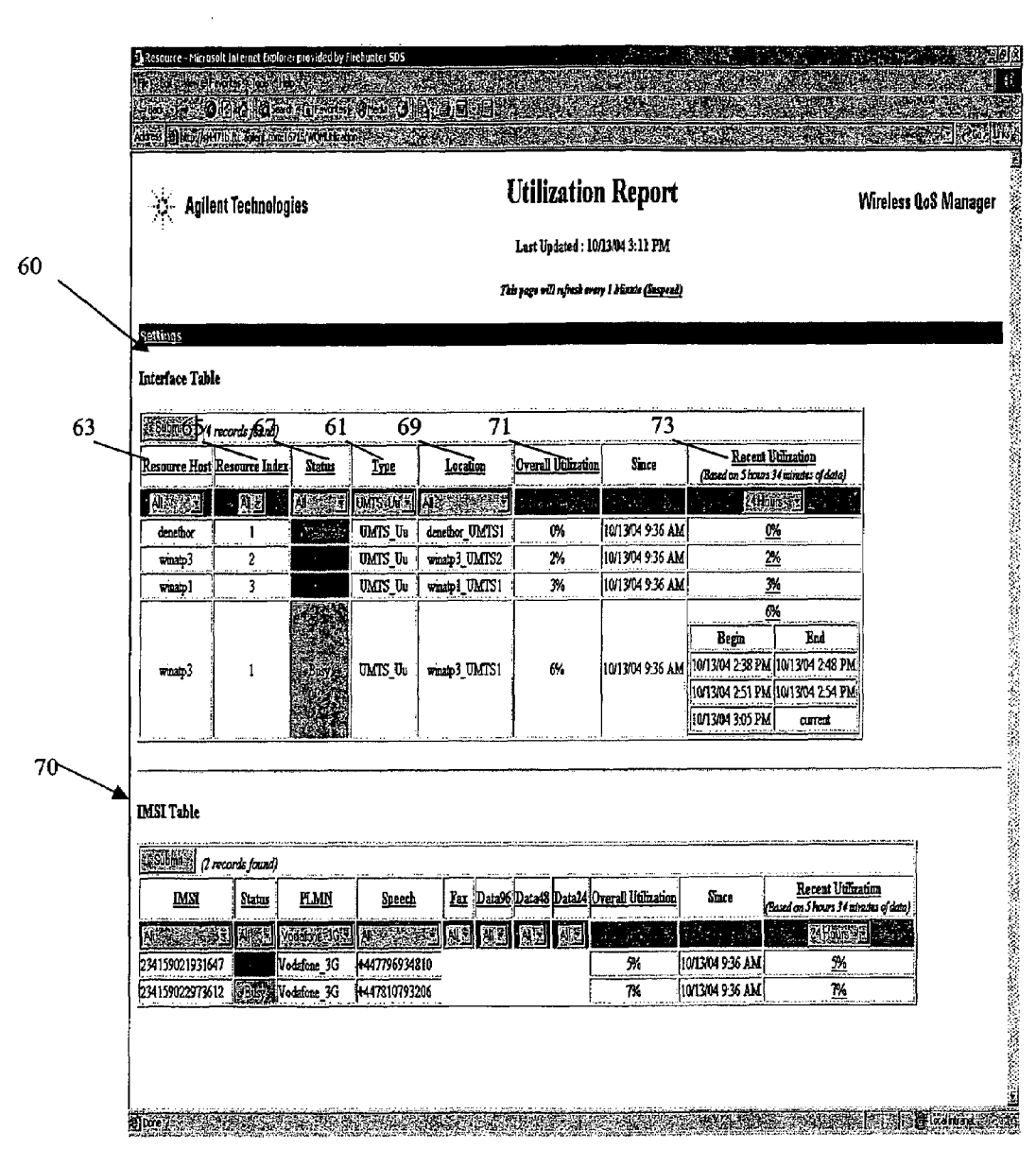

With still further reference primarily to FIG. 2, utilization servlet 57 can be a web-based tool that can allow customers to query information on resource utilization and generate at least one utilization report 55. At least one utilization report 55 can be divided into interface table 60 (FIG. 3) and IMSI table 70 (FIG. 3). Each table can show at least one resource entry 51 that had been discovered by resource monitor 27, the properties for each at least one resource 16, and overall and most recent utilization information. Utilization servlet 57 can provide, for example, but not limited to:

(1) Sortable columns, both ascending and descending, for example, by clicking on the column titles;
(2) Multi-tiered sorting by column first, then by recent utilization;
(3) Column filtering, for example, by choosing specific data to search for;
(4) Recent utilization window 39 specification;
(5) Automatic configurable refreshes, for example, every 30 seconds, every 1, 2, 3, 4, 5 minutes;
(6) Customized views via column hiding; and
(7) Data hiding, for example, showing each at least one utilization period 49 on demand.

Referring now primarily to FIG. 3, interface table 60 column "Type" 61 indicates what type of at least one interface 15 (FIG. 1) is on the probe (multiple at least one interfaces 15 can exist on the probe). Column "Resource Host" 63 indicates upon which host the probe resides. Column "Resource Index" 65 indicates which slot at least one interface 15 is using within the probe. Column "Status" 67 indicates the state of at least one interface 15. There can be, for example, five states: (1) busy—at least one interface 15 is currently in use, (2) idle—at least one interface 15 is currently not in use, (3) reserved—at least one interface 15 is about to be used, (4) disabled—at least one interface 15 is disabled by the administrator, (5) down—at least one interface 15 is not operational for some reason. Column "Location" 69 is a logical name for at least one interface 15 and is used during test configuration. Column "Overall Utilization" 71 shows the percentage of time in which at least one interface 15 has been utilized since (the next column) the test has been running. Column "Recent Utilization" 73 shows what the recent utilization has been over the last n time periods, for example, minutes or hours, where n is a configurable property. IMSI table 70 shows SIM utilization similar to interface table 60. The only columns that differ are those that are SIM-specific instead of interface specific. All columns that are underlined support sorting. Hitting the same link again, will sort the column in the inverse order. To filter at least one interface 15 based upon user 23 (FIG. 1), an extension to the URL specifying the user 23 (e.g. http://<agentHost:16715>/WQMUtilization?user=<someuser>) can be used. The same presentation is shown, minus at least one interface 15 that is not configured for user 23.

Figure 4:
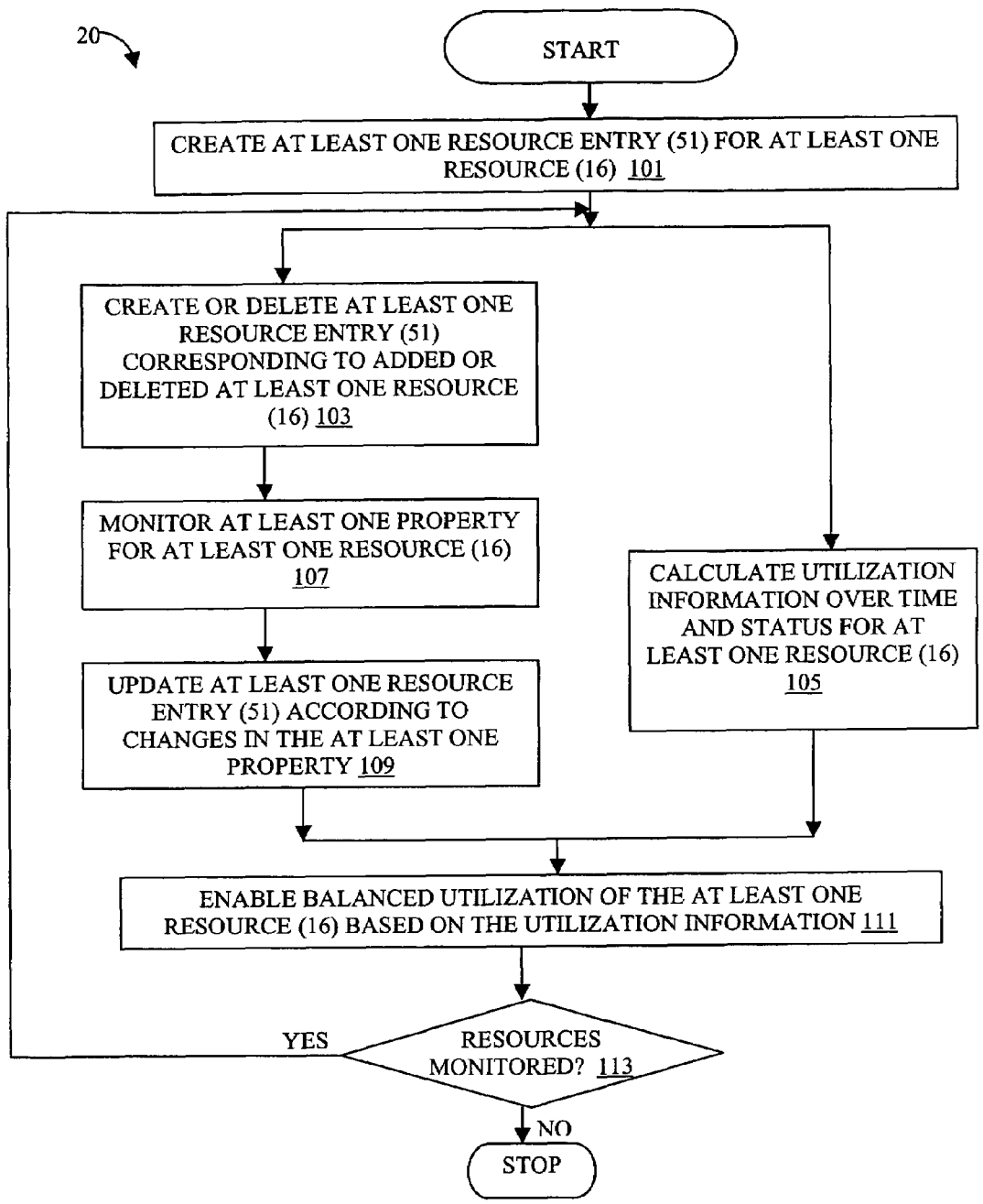
FIG. 4 is a flowchart of the method of the illustrative embodiment of the present invention.

Referring now primarily to FIG. 4, method 20 can include the step of creating at least one resource entry 51 (FIG. 1) for at least one resource 16 (FIG. 1) (method step 101). According to one parallel leg of execution, method 20 can further include the steps of dynamically creating or deleting at least one resource entry 51 as resources are added and deleted from the underlying database (method step 103), monitoring at least one property of the at least one resource 16 (method step 107), and updating the at least one resource entry 51 according to changes in the at least one property (method step 109). According to a second parallel leg of execution, method 20 can include the step of monitoring and calculating utilization information and status for the at least one resource 16 (method step 105). For both legs of parallel execution, method 20 can include the step of enabling balanced utilization of the at least one resource 16 based on the utilization information (method step 111). As long as the at least one resource 16 is monitored (decision step 113), method 20 can continue with parallel method steps 103 and 105. When the at least one resource 16 is no longer monitored (decision step 113), method 20 terminates.

Referring to FIGS. 1 and 4, method 20 (FIG. 4) can be, in whole or in part, implemented electronically. Signals representing actions taken by elements of system 10 (FIG. 1) can travel over at least one communications network 16 (FIG. 1). Control and data information can be electronically executed and stored on at least one computer-readable medium 16A (FIG. 1). The system can be implemented to execute on at least one computer node 14 (FIG. 1) in at least one communications network 16. Common forms of at least one computer-readable medium 16A can include, for example, but not limited to, a floppy disk, a flexible disk, a hard disk, magnetic tape, or any other magnetic medium, a CDROM or any other optical medium, punched cards, paper tape, or any other physical medium with patterns of holes, a RAM, a PROM, and EPROM, a FLASH-EPROM, or any other memory chip or cartridge, or any other medium from which a computer can read.

Although the invention has been described with respect to various embodiments and methods, it should be realized that this invention is also capable of a wide variety of further and other embodiments and methods within the spirit and scope of the appended claims.

What is claimed is:

1. A system for enabling balanced resource utilization, of at least one resource during wireless network testing, comprising:
   at least one resource entry capable of monitoring at least one property of said at least one resource during wireless network testing;
   a resource monitor capable of monitoring said at least one resource entry while said at least one resource entry dynamically monitors said at least one property,
   wherein said resource monitor is capable of calculating status and utilization information over time based on said at least one property to track usage of said at least one resource, and enabling balanced utilization of said at least one resource according to said utilization information; and
   a utilization report showing the at least one resource entry and having sortable criteria and dynamically updateable fields based on changes to the at least one property.

2. The system as defined in claim 1 further comprising:
   a database capable of storing configuration information for said at least one resource;
   wherein said resource monitor is capable of updating said at least one resource entry based on said configuration information.

3. The system as defined in claim 1 wherein said at least one resource entry comprises:
   a utilization calculator capable of computing said utilization information over time for said at least one resource;
   a recent utilization window capable of collecting said utilization information;
   a status manager capable of determining a status for said at least one resource;
   a property updater capable of managing updates to said at least one resource entry; and
   a filter comparator capable of comparing said at least one resource entry to criteria from a resource filter, said filter comparator capable of invoking said recent utilization window if said at least one resource entry passes said criteria from said resource filter.

4. The system as defined in claim 1 wherein said resource monitor further comprises:
   a utilization broker capable of managing requests to calculate said utilization information for said at least one resource;
   a resource tracker capable of monitoring said at least one property of said at least one resource;
   an instance manager capable of determining updates to said at least one resource entry, said instance manager capable of identifying said at least one resource that has been newly-added, said instance manager capable of identifying said at least one resource that has been deleted; and
   a query manager capable of managing query requests for said at least one resource entry.

5. The system as defined in claim 1 further comprising:
   a utilization servlet capable of accessing said utilization information, said utilization servlet capable of generating at least one utilization report.

6. The system as defined in claim 5 wherein said utilization servlet comprises a web-based tool.

7. The system as define in claim 5 wherein said at least one utilization report comprises an interface report.

8. The system as define in claim 5 wherein said at least one utilization report comprises an International Mobile Subscriber Identifier report.

9. A method for enabling balanced resource utilization of at least one resource during wireless communications testing comprising the steps of:
   creating at least one resource entry for at least one resource that has been added to a database;
   deleting at least one resource entry for at least one resource that has been deleted from the database;
   monitoring at least one property of the at least one resource;
   dynamically updating the at least one resource entry according to changes in the at least one property;
   substantially in parallel with said step of dynamically updating the at least one resource entry, calculating status and utilization information over time for the at least one resource based on the updated at least one resource entry to track usage of said at least one resource;
   enabling balanced utilization of the at least one resource based on the utilization information; and
   generating a utilization report showing the at least one updated resource entry, the utilization report having sortable criteria and dynamically updateable fields based on changes to the at least one property.

10. At least one computer node for carrying out the method according to claim 9.

11. At least one communications network comprising at least one computer node according to the method of claim 9.

12. At least one computer readable medium having instructions embodied therein for the practice of the method of claim 9.

13. A method for balancing resource utilization of at least one resource during a wireless communications test comprising the steps of:
   configuring the at least one resource;
   creating at least one resource entry having at least one property;
   dynamically updating the at least one property as the status of the at least one resource changes;

calculating status and utilization information over time based on querying of the at least one resource entry while said step of updating proceeds to track usage of said at least one resource;

enabling balanced utilization of the at least one resource based on the utilization information; and generating a utilization report showing the at least one resource entry, the utilization report having sortable criteria and dynamically updateable fields based on changes to the at least one property.

14. The method as defined in claim 13 further comprising the steps of:

receiving criteria from a resource filter; and providing the utilization information based on the criteria from the resource filter in the form of at least one utilization report.

15. The method as defined in claim 13 further comprising the steps of: enabling ad hoc testing based on the utilization information.

16. A system for enabling balanced resource utilization of at least one resource during wireless communications testing comprising:

means for creating at least one resource entry for at least one resource;

means for monitoring at least one property of said at least one resource;

means for storing said at least one property in said at least one resource entry;

means for dynamically updating said at least one resource entry according to changes in the at least one property;

means for calculating status and utilization information over time for said at least one resource substantially in parallel with said means for monitoring entry to track usage of said at least one resource;

means for enabling balanced utilization of said at least one resource based on the utilization information; and means for generating a utilization report showing the at least one resource entry, the utilization report having sortable criteria and dynamically updateable fields based on changes to the at least one property.

17. A system for balancing resource utilization of at least one resource during a wireless communications test comprising:

means for configuring the at least one resource;

means for creating at least one resource entry having at least one property;

means for dynamically updating said at least one property as the status of the at least one resource changes;

means for calculating status and utilization information over time while said means for updating proceeds to track usage of said at least one resource;

means for enabling balanced utilization of the at least one resource based on said utilization information; and means for generating a utilization report showing the at least one resource entry, the utilization report having sortable criteria and dynamically updateable fields based on changes to the at least one property.

18. The system as defined in claim 17 further comprising:

means for receiving criteria from a resource filter; and means for providing said utilization information based on said criteria from said resource filter in the form of at least one utilization report.

19. The system as defined in claim 17 further comprising: means for enabling ad hoc testing based on said utilization information.

* * * * *